(12) United States Patent
Schuster et al.

(10) Patent No.: US 7,484,420 B2
(45) Date of Patent: Feb. 3, 2009

(54) FASTENER ASSEMBLY AND METHOD

(75) Inventors: Michael J. Schuster, Joliet, IL (US); Larry Lee Schneider, Wadsworth, IL (US)

(73) Assignee: MJSI, Inc., Shorewood, IL (US)

( * ) Notice: Subject to any disclaimer, the term of this patent is extended or adjusted under 35 U.S.C. 154(b) by 0 days.

(21) Appl. No.: 11/550,222

(22) Filed: Oct. 17, 2006

(65) Prior Publication Data
US 2007/0084292 A1    Apr. 19, 2007

Related U.S. Application Data

(60) Provisional application No. 60/727,719, filed on Oct. 18, 2005.

(51) Int. Cl.
*F16B 31/02* (2006.01)
(52) U.S. Cl. ........................................... 73/761
(58) Field of Classification Search ................... 73/761; 411/206–369
See application file for complete search history.

(56) References Cited

U.S. PATENT DOCUMENTS

| | | | |
|---|---|---|---|
| 0,996,743 A | 7/1911 | Yancey | |
| 1,787,601 A | 1/1931 | Swanberg | |
| 2,087,503 A | 7/1937 | Clemmons | |
| 2,465,866 A | 3/1949 | Gaines | |
| 2,512,176 A | 6/1950 | Shaffer | |
| 2,736,037 A | 2/1956 | Hardie | |
| 2,791,235 A | 5/1957 | Smith | |
| 2,799,865 A | 7/1957 | Dufault | |
| 3,040,769 A | 6/1962 | Lamb | |
| 3,086,546 A | 4/1963 | Brown | |
| 3,172,128 A | 3/1965 | Ducey | |
| 3,321,972 A | 5/1967 | Goldtrap | |
| 3,457,947 A | 7/1969 | Fitzgerald | |
| 3,640,128 A * | 2/1972 | Cunning et al. | 73/118.1 |
| 3,744,064 A | 7/1973 | Preston | |
| 3,986,216 A | 10/1976 | Davis et al. | |
| 3,994,628 A | 11/1976 | Kemper | |
| 4,007,498 A | 2/1977 | Pearson | |
| 4,017,916 A | 4/1977 | Pearson | |
| 4,020,734 A * | 5/1977 | Bell | 411/10 |
| 4,032,822 A | 6/1977 | Un | |
| 4,090,532 A | 5/1978 | Story, Jr. | |
| 4,134,164 A | 1/1979 | Sanmartin Rial | |
| 4,138,820 A * | 2/1979 | O'Connor | 33/562 |
| 4,145,775 A | 3/1979 | Butler | |
| 4,351,071 A | 9/1982 | Clar | |
| 4,392,260 A | 7/1983 | Bensen | |
| 4,420,845 A | 12/1983 | Antunez | |

(Continued)

OTHER PUBLICATIONS

International Search Report and Written Opinion dated May 25, 2007.

*Primary Examiner*—Max Noori
(74) *Attorney, Agent, or Firm*—Thomas, Kayden, Horstemeyer & Risley, LLP

(57) ABSTRACT

A fastener assembly and method are provided. In one embodiment, the fastener assembly comprises a nut compatible with a threaded shaft. A rotation indicator having at least one indicator extension is attached to the nut. At least one protruding structure extends from the nut. The protruding structure interferes with the indicator extension when the nut is rotated on the threaded shaft and the rotation indicator is compressed between the nut and a surface.

23 Claims, 5 Drawing Sheets

U.S. PATENT DOCUMENTS

| | | | |
|---|---|---|---|
| 4,472,097 A * | 9/1984 | Kiefer et al. | 411/369 |
| 4,527,295 A | 7/1985 | Lacore | |
| 4,600,031 A | 7/1986 | Nestich | |
| 4,700,413 A | 10/1987 | Lopez | |
| 4,707,867 A | 11/1987 | Kawabe et al. | |
| 4,764,996 A | 8/1988 | Pino | |
| 4,793,588 A | 12/1988 | Laverty, Jr. | |
| 4,918,764 A | 4/1990 | Haselswerdt et al. | |
| 4,940,377 A | 7/1990 | Reynolds | |
| 4,980,932 A | 1/1991 | Stemples | |
| 4,995,652 A * | 2/1991 | Mugnolo et al. | 292/202 |
| 5,007,452 A | 4/1991 | Antunez | |
| 5,036,553 A | 8/1991 | Sanderson | |
| 5,052,060 A | 10/1991 | Makita et al. | |
| 5,083,323 A | 1/1992 | Cannan | |
| 5,134,729 A | 8/1992 | Shaw | |
| 5,228,152 A | 7/1993 | Fraley | |
| 5,232,011 A | 8/1993 | Royalty | |
| 5,245,710 A | 9/1993 | Haselswerdt et al. | |
| 5,327,931 A | 7/1994 | Royalty et al. | |
| 5,362,026 A | 11/1994 | Kobayashi et al. | |
| 5,432,959 A | 7/1995 | Ellsworth et al. | |
| 5,442,820 A | 8/1995 | Becker | |
| 5,469,586 A | 11/1995 | Tsutsui et al. | |
| 5,542,448 A | 8/1996 | Campbell et al. | |
| 5,606,753 A * | 3/1997 | Hashimoto | 411/7 |
| 5,708,991 A | 1/1998 | DeMarco | |
| 5,715,860 A | 2/1998 | Horad | |
| 5,742,951 A | 4/1998 | Wright et al. | |
| 5,775,366 A | 7/1998 | Ray et al. | |
| 5,794,279 A | 8/1998 | Schwartz | |
| 5,862,537 A | 1/1999 | Osmond | |
| 5,890,857 A * | 4/1999 | Herrera | 411/11 |
| 5,904,176 A | 5/1999 | Li | |
| 6,202,227 B1 | 3/2001 | Gurowitz | |
| 6,219,856 B1 | 4/2001 | Alles | |
| 6,263,519 B1 | 7/2001 | Parsons et al. | |
| 6,295,660 B1 | 10/2001 | Schuster | |
| 6,385,788 B1 | 5/2002 | Wasielewski | |
| 6,510,866 B2 | 1/2003 | Li | |
| 6,560,790 B2 | 5/2003 | Saar et al. | |
| 6,595,597 B2 * | 7/2003 | Marczynski et al. | 301/37.374 |
| 6,666,228 B1 | 12/2003 | Li | |
| 6,679,285 B2 | 1/2004 | Pablo | |
| 6,789,990 B1 * | 9/2004 | Harris et al. | 411/206 |
| 6,823,889 B1 | 11/2004 | Schuster | |
| 2002/0044849 A1 * | 4/2002 | Wakabayashi | 411/222 |
| 2002/0092090 A1 | 7/2002 | Johnson | |
| 2002/0162166 A1 | 11/2002 | Saar et al. | |

\* cited by examiner

FASTENER ASSEMBLY AND METHOD

CROSS REFERENCE TO RELATED CASES

This application claims priority to co-pending U.S. Provisional Patent Application 60/727,719 entitled "Fastener Assembly and Method," filed on Oct. 18, 2005, which is incorporated herein in its entirety.

BACKGROUND

It is very common for individuals to replace a fill valve in a toilet that may leak or be faulty in some other manner. When a typical fill valve is installed in the toilet, a threaded shaft of the fill valve may be placed through a hole in the bottom of a porcelain toilet tank. Thereafter, a nut is engaged on the thread, thereby clamping the porcelain between a sealing face of the fill valve and a face of the nut. Unfortunately, due to the fact that many unskilled individuals are concerned that a leak may form at the junction of the fill valve and the porcelain itself, it is often the case that individuals apply too much torque the nut to prevent leaks. This generates unwanted compression of the porcelain that, over time, often results in cracking of the porcelain resulting in the leaks that individual wished to avoid in the first place. Also, the application of too much torque to the nut may result in stripping of threads or cracking of the nut or the threaded shaft.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
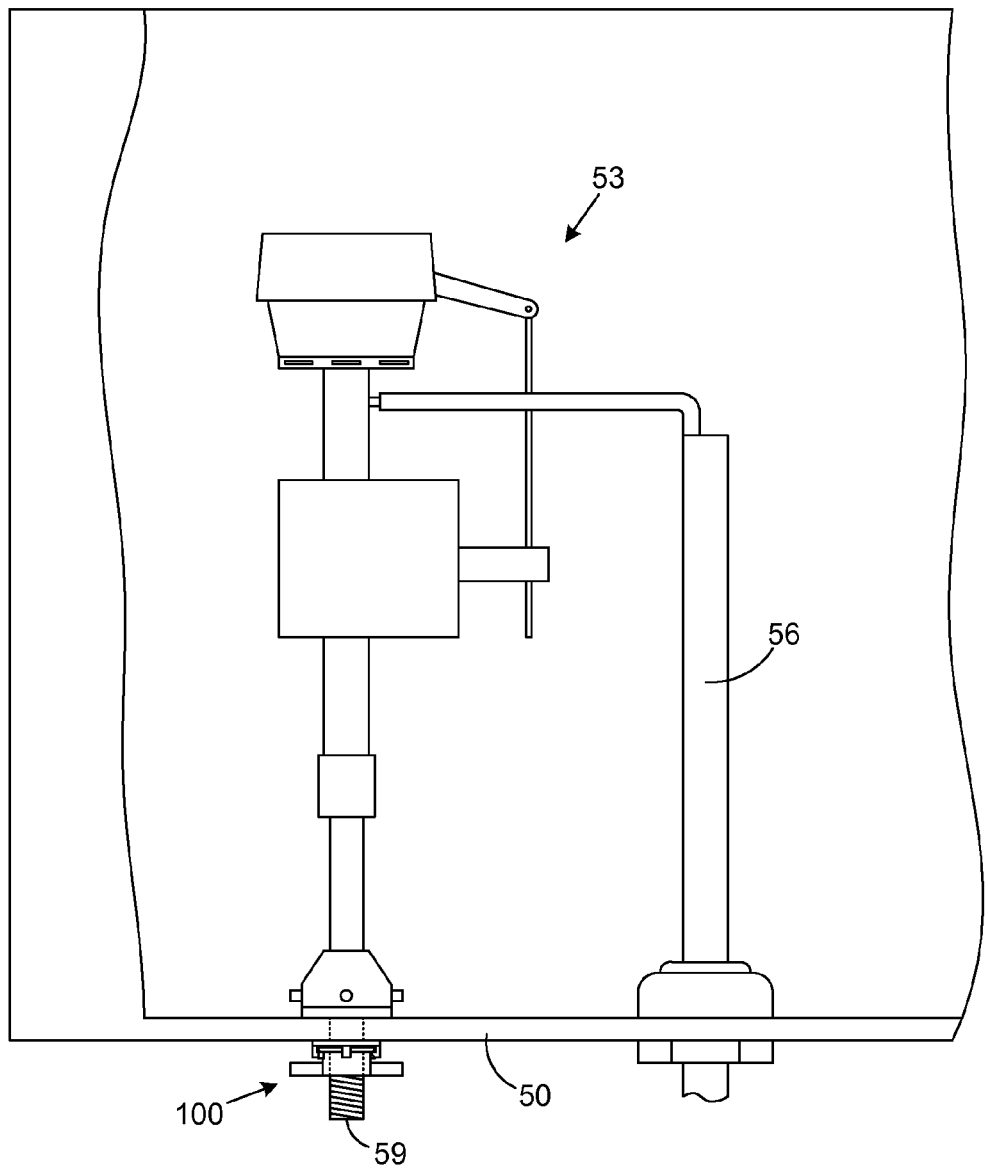
FIG. 1 shows a drawing of a portion of a toilet tank with a fill valve installed therein using a fastener assembly according to an embodiment of the present invention.

With reference to FIG. 1 shown is a portion of a toilet tank 50 within which is disposed a fill valve 53 and an overflow tube 56. The toilet tank 50 may comprise, for example, a porcelain toilet tank or may be constructed of other materials as can be appreciated. The fill valve 53 is attached to the toilet tank 50 by extending a threaded shaft 59 through a hole in the bottom of the toilet tank 50 as shown. According to various embodiments of the present invention, a fastener assembly 100 is employed to fasten the fill valve 53 to the toilet tank 50. Specifically, a portion of the toilet tank 50 adjacent to the hole through which the threaded shaft 59 is extended is compressed between a sealing face of the fill valve 53 and the fastener assembly 100.

Figure 2:
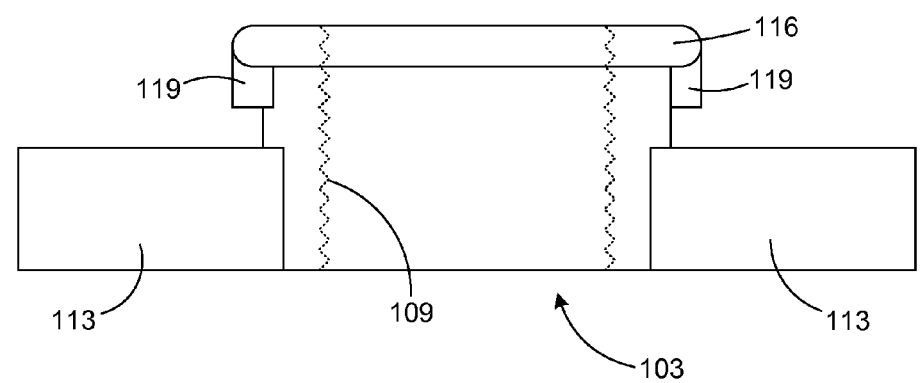
FIG. 2 shows a drawing of a rotation indicator and a nut of the fastener assembly of FIG. 1 according to an embodiment of the present invention.

Referring next to FIG. 2, shown is a side exploded view of the fastener system 100 according to an embodiment of the present invention. As shown, the fastener assembly 100 includes a nut 103 and a rotation indicator 106. The nut 103 comprises an internal thread 109 that is compatible with an external thread on the threaded shaft 59 of the fill valve 53 (FIG. 1). The nut 103 also includes levers 113 that facilitate installment of the nut 103 onto the threaded shaft 59 by hand. The nut 103 also includes a lip 116 and protruding structures 119.

The rotation indicator 106 includes indicator extensions 123 that extend from one side of the rotation indicator 106. In one embodiment, a portion of the rotation indicator 106 comprises a washer 126. In this embodiment, the indicator extensions 123 extend from one side of the washer 126.

Figure 3:
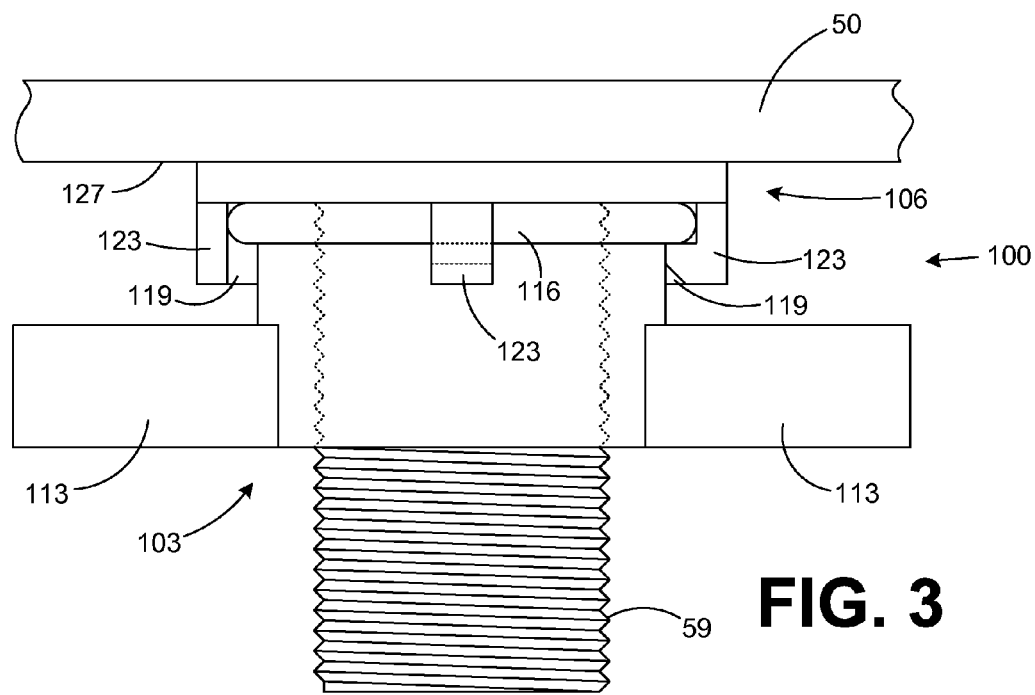
FIG. 3 shows the fastener assembly of FIG. 1 assembled on a threaded shaft of a toilet fill valve according to an embodiment of the present invention.

Referring next to FIG. 3, is the fastener assembly 100 as it is assembled on the threaded shaft 59 according to an embodiment of the present invention. The nut 103 includes an internal thread that is compatible with the external thread of the threaded shaft 59 (FIG. 1). In this respect, the nut 103 is thus compatible with the threaded shaft 59. The indicator extensions 123 of the rotation indicator 106 are positioned to interfere with the protruding structures 119 when the nut 103 is rotated along the threaded shaft 59, and when the rotation indicator 106 is compressed between the nut 103 and a surface 127 of the toilet tank 50. It is understood that the use of the fastener assembly 100 to fasten a toilet fill valve 53 (FIG. 1) to the toilet tank 50 provides one illustration of the use of the fastener assembly 100. Accordingly, it is understood that the fastener assembly 100 may also be used in a multitude of other applications in which it is desirable that the torque applied to the nut 103 in generating a compressive force against a given surface is below a predefined torque threshold. In the embodiments described herein, it is desirable, for example, that the torque applied to the nut 103 is below a threshold that correspondingly generates a compressive force against the surface 127 of the toilet tank 50 that is below the compressive force that may result in cracking of the porcelain of the toilet tank 50, stripping of threads on the nut 103/threaded shaft 59, or cracking of the nut 103/threaded shaft 59 as can be appreciated. The actual compressive force that results in the unwanted cracking of porcelain may vary from case to case depending upon the thickness of the toilet tank 50, the compression of the seal, and other factors as can be appreciated. Thus, the maximum compressive force to be applied may be determined empirically.

Figure 4:
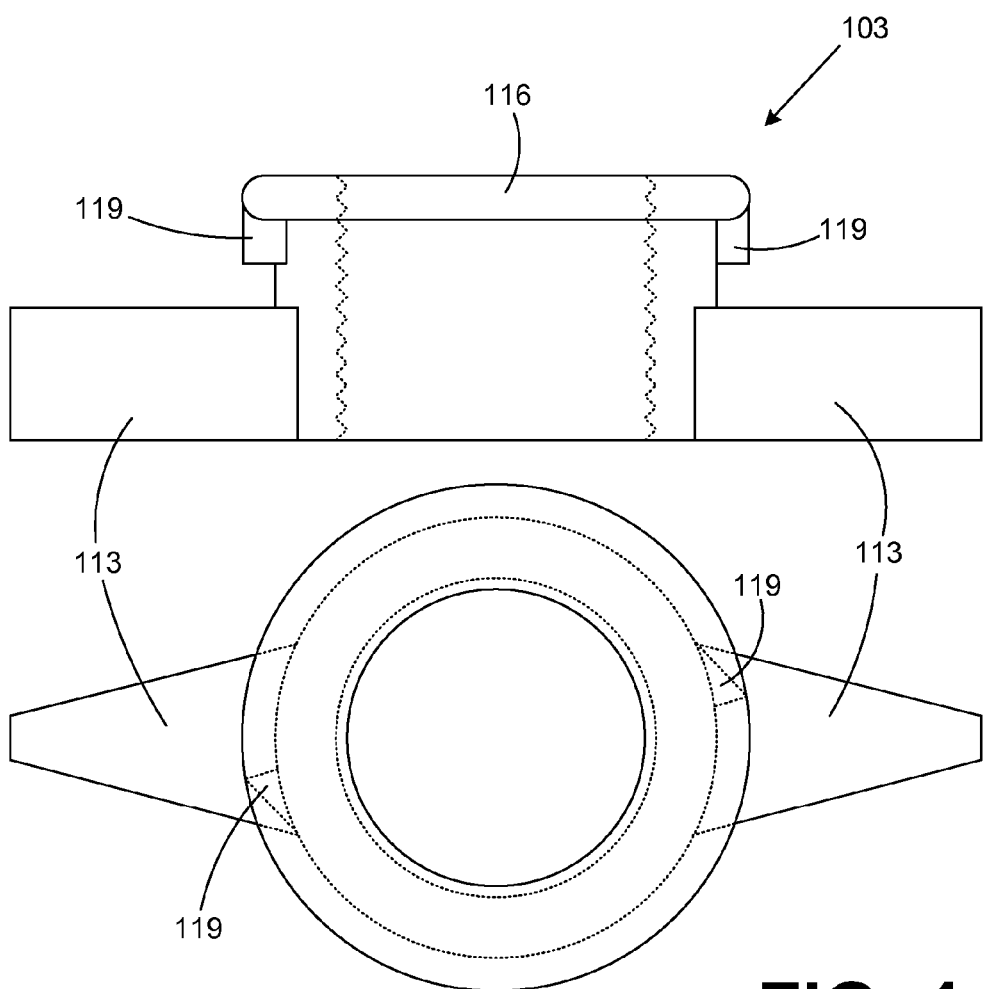
FIG. 4 shows further shows a nut of the fastener assembly of FIG. 1 according to an embodiment of the present invention.

Turning then to FIG. 4, shown is a further view of the nut 103 that illustrates the protruding structures 119 extending from a side of the nut 103. Also, the levers 113 extend from the side of a nut 103, thereby providing for a grip for an individual so that the nut 103 may be torqued onto the threaded shaft 59 (FIG. 3) by hand. This advantageously provides a means for limiting the amount of torque applied to the nut 103 in fastening the fill valve to the toilet tank 50. In addition, the nut 103 includes the lip 116 that advantageously facilitates attachment of the rotation indicator 106 (FIG. 2) to the nut 103 in a manner that the rotation indicator 106 may rotate relative to the nut 103 and the indicator extensions 123 (FIG.

2) periodically engage the protruding structures 119 when the rotation indicator 106 is compressed against the surface 127 (FIG. 3).

In addition, FIG. 4 shows a top view of the nut 103 in which the levers 113 radially extend from a side of the nut 103. In addition, the nut 103 is circular in shape. These features provide an advantage in that the circular shape prevents the effective use of a wrench such as, for example, a crescent wrench or an open ended wrench to torque the nut 103 on the shaft 59. This prevents a user from applying too much torque to the nut 103 resulting in unwanted compression of the toilet tank 50 (FIG. 3). In addition the levers 113 facilitate the fastening of the nut 103 onto the shaft 59 by hand and generally interferes with any attempts to attach a wrench such as, for example, a pipe wrench to the nut 103. This feature also preventing a user from applying too much torque to the nut 103 during installation of the fill valve 53 (FIG. 1).

The lip 116 extends radially from an upper portion of the nut 103. In this respect, the indicator extensions 123 may grip the lip 116, thereby loosely attaching the rotation indicator 106 to the nut 103. This is advantageous as the fastener assembly 100 may be packaged and shipped with both the nut 103 and the rotation indicator 106 coupled together as a single unit.

In one embodiment, the protrusion structures 119 each comprise a ramp that extends radially from the side surface of the nut 103. Alternatively, the protrusions structures 119 may comprise any structure that extends from the side of the nut 103. For example, the protrusions structures 119 may comprise a ridge that also extends longitudinally along a side of the nut 103. As an additional alternative, the protrusion structures 119 may actually comprise corners of a nut 103 in the case that the nut 103 is shaped like a hexagon or other geometric shape as can be appreciated. However, to the extent that the protrusion structures 119 comprise corners of a nut 103 that is in the shape of a hexagon or other shape, for example, the advantages of preventing the use of a wrench may be compromised to a degree.

Figure 5:
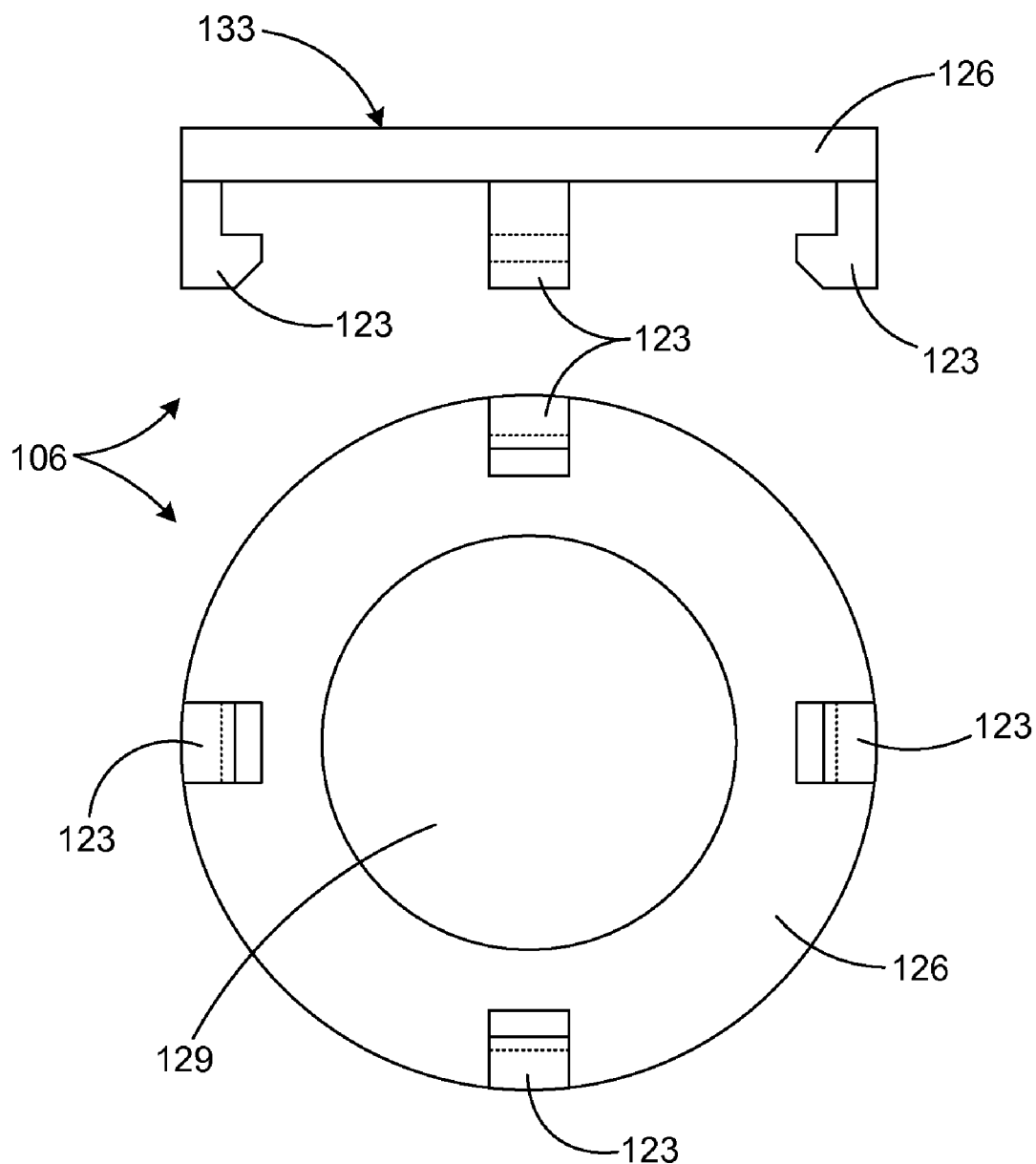
FIG. 5 shows additional views of a rotation indicator of the fastener assembly of FIG. 1 according to an embodiment of the present invention.

Referring next to FIG. 5, shown is a side view and a bottom view of the rotation indicator 106 according to various embodiments of the present invention. As shown, the rotation indicator 106 includes the indicator extensions 123. In one embodiment, the indicator extensions 123 are formed in the shape of cantilever arms that extend from the rotation indicator 106.

In one embodiment, the rotation indicator 106 includes a portion that is formed in the shape of a washer 126 as described above. The washer 126 includes an orifice 129. The indicator extensions 123 extend from one side of the washer 126. The diameter of the orifice 129 is greater than an outer diameter of the threaded shaft 59 so that the threaded shaft 59 may fit through the washer 126. In one embodiment, the indicator extensions 123 are positioned along an outer perimeter of the washer 126 so as to be able to grip around the lip 116 (FIG. 4) of the nut 103 (FIG. 4).

The rotation indicator 106 includes a face 133 that comes into contact with the surface 127 (FIG. 3) of the porcelain of the toilet tank 50 (FIG. 1). In one embodiment the face 133 is the side of the washer 126 opposite the side from which the indicator extensions 123 extend as described above. The face 133 may be formed or otherwise conditioned to provide for greater friction between the rotation indicator 106 and the surface 127 of the toilet tank 50 (FIG. 1). In this respect, the face 133 may be formed to generate a grip surface that includes grooves, a roughened surface, a grated surface, or other surface condition that facilitate greater gripping or friction with the surface 127.

Alternatively, an adhesive or friction coating may be disposed on the face 133 of the rotation indicator 106 to provide for greater friction between the rotation indicator 106 and the face 133. In this respect, an adhesive may be employed, for example, that is covered by a disposable sheet of wax paper or other covering that may be removed prior to installation.

The formation or conditioning of the face 133 ensures that the rotation indicator 106 is held stationary relative to the surface 127 when compressed by virtue of the torque applied to the nut 103. This advantageously allows the extension indicators 123 to interfere with the protruding structures 119 while the nut 103 is rotated after the rotation indicator 106 contacts the surface 127. In this respect, once the nut 103 has become snug relative to the surface 127, then the maximum torque applied to the nut 103 may be regulated by limiting the rotation of the nut 103 such that the protrusions 119 contact the indicator extensions 123 a predefined number of times.

For example, where the protruding structures 119 comprise ramps, then the indicator extensions 123 flex outward when contacting the ramps and then will snap back into their original shape when the ramps are cleared as the nut 103 is rotated. In this respect, the individual tightening the nut 103 may be apprised of the torque applied by virtue of counting the number of times the indicator extensions 123 "click" as they periodically interfere with the protrusion structures 119 as can be appreciated. In this manner, an individual might keep turning the nut 103 until a certain number of clicks are counted. The indicator extensions 123 are made of a material that allows them to flex outward as necessary due to the interference by the protruding structures 119.

Figure 6:
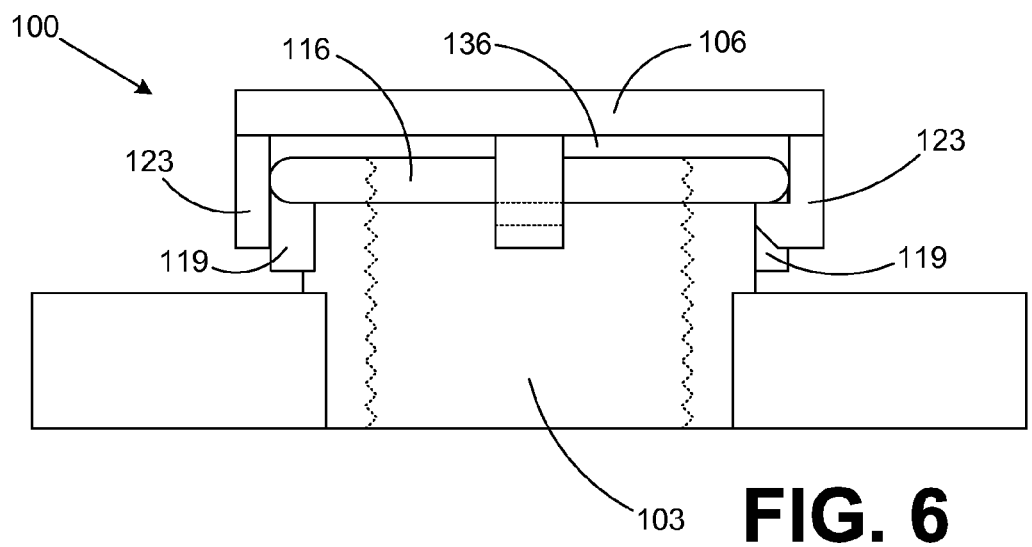
FIG. 6 shows the fastener assembly of FIG. 1 in which the rotation indicator is attached to the nut according to an embodiment of the present invention.

Referring next to FIG. 6, shown is the fastener assembly 100 in which the rotation indicator 106 is attached loosely to the nut 103. As shown, the indicator extensions 123 grips around the lip 116 that extends from the upper portion of the nut 103. In this respect, in one embodiment, the indicator extensions 123 comprise cantilever arms that grip around the lip 116. In an alternative embodiment shown in FIG. 6, the indicator extensions 123 are longer, such that a gap 136 is formed between the rotation indicator 106 and the nut 103. In this respect, the rotation indicator 106 thus fits loosely on to the nut 103 rather than a more snug fit as shown, for example, with reference to FIG. 3. In any event, regardless of whether the fit is loose or snug, movement is allowed between the nut 103 and the rotation indicator 106 when the rotation indicator 106 is compressed as described above. To accommodate the longer indicator extensions 123, the protrusion structures 119 are also increased in length by the same proportion.

Figure 7:
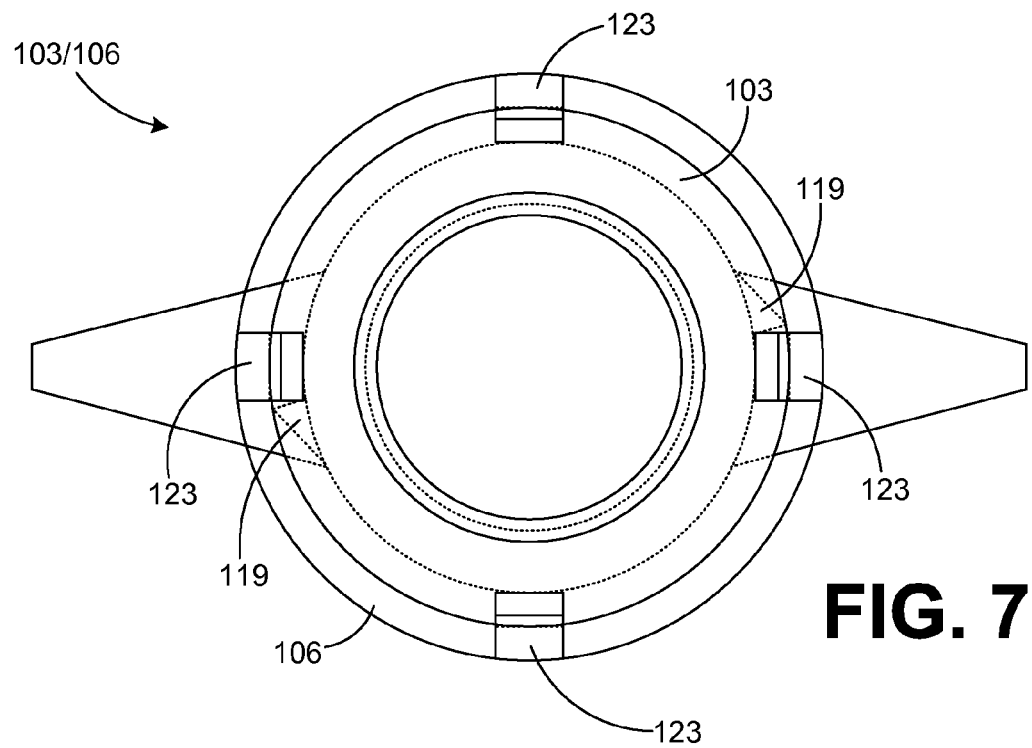
FIG. 7 shows another view of the assembly of the fastener assembly of FIG. 1 in which the rotation indicator is attached loosely to the nut according to an embodiment of the present invention.

Turning then to FIG. 7 is a top view of the rotation indicator 106 as it is attached to the nut 103. As shown, two of the indicator extensions 123 are located next to the protrusion structures 119 and there is a total of four indicator extensions 123. As the nut 103 is rotated, the indicator extensions 123 interfere with the protruding structures 119 with each quarter turn, thereby resulting in an audible "click" at every quarter turn.

Although four indicator extensions 123 are shown, it is understood that any number of indicator extensions 123 may be employed in conjunction with the rotation indicator 106. Also, any number of protrusion structures 119 may also be employed in conjunction with the nut 103 to facilitate the audible indication of any fraction of rotation of the nut 103 relative to the rotation indicator 106. Specifically, the choice of the number of protrusion structures 119 and/or indicator extensions 123 depends upon the tolerance of torque and/or compressive force that is to be applied by the fastener structure 100 and is design specific.

In one embodiment, the rotation indicator 106 and the nut 103 are constructed of a plastic material. Alternatively, the same may be constructed of any appropriate material such as, for example, metal, or other appropriate material. However, whichever material is employed, the indicator extensions 123 should be allowed to flex or provide a level of compliance so that the nut 103 may be rotated relative to the indicator extensions 123 and interference between the indicator extensions 123 and the protrusion structures 119 should not appreciably impede the ability of an individual to rotate the nut 103 by hand.

In addition, as an additional alternative, it is understood that the indicator extensions 123 may extend from the nut 103, and the protrusion structures 119 may be disposed on the rotation indicator 106 to accomplish the same indication of rotation as described above.

With reference back to FIG. 3, according to an embodiment of the present invention, the amount of friction generated between the face 133 of the rotation indicator 106 (FIG. 5) and the surface 127 of the toilet tank 50 (FIG. 1) is greater than the amount of friction generated between the rotation indicator 106 and the nut 103 when the rotation indicator 106 is compressed between the nut 103 and the surface 127. This allows the nut 103 to be further rotated to tighten the fastening structure 100 as desired while the rotation indicator 106 remains stationary relative to the surface 127. In this manner, the extension indicators 123 periodically engage or interfere with the protruding structures 119. Alternatively, where the indicator extensions 123 are disposed on the nut 103, and the protruding structures 119 are disposed on the rotation indicator 106, then it is the protruding structures 119 that would be held stationary while the nut 103 is rotated 103.

Thus, in another embodiment of the present invention, a example method for limiting the amount of torque employed to fasten the nut 103 to the threaded shaft 59 is provided. In one embodiment, the method includes the steps of rotating the nut 103 to engage the inner thread of a nut 103 with an outer thread of the threaded shaft 59. The nut 103 is rotated along the threaded shaft 59 until a rotation indicator 106 attached to the nut 103 is compressed between the nut 103 and the surface 127. At this point, at least one indicator extension 123 extended from the rotation indicator 106 periodically engages at least one protrusion structure 119 positioned on the side of the nut 103 due to the continued rotation of the nut 103.

The nut 103 is further rotated after the rotation indicator 106 is compressed between the nut 103 and the surface 127 so that at least one indicator extension 123 engages the at least one protrusion structure 119 a predefined number of times, thereby limiting the force exerted against the surface 127 by the nut 103. In addition, the present method comprises the step of loosely attaching the rotation indicator 106 to a lip 116 extending from the side of the nut 103 with the at least one indicator extension 123, where the at least one indicator extension 123 comprises a cantilever arm or other appropriate class structure.

In rotating the nut 103 along the threaded shaft 59 (FIG. 1), an individual grips the levers 113 extending from the side of the nut 103 by hand to turn the nut 103 on the threaded shaft 59.

In addition, the foregoing method where the threaded shaft 59 extends from the bottom of a toilet fill valve 53 (FIG. 1), the method further comprises the steps of positioning the threaded shaft 59 of the toilet fill valve 53 through a hole in the porcelain tank 50 (FIG. 1) of a toilet. In this respect, a portion of the porcelain tank 50 (the portion around the hole) is compressed between the rotation indicator 106 and the sealing face of the toilet fill valve 53. In performing the present method, the step is performed of limiting the compression of the portion of the porcelain tank 50 below a predefined amount of compressive force that would normally result in a cracking of the porcelain tank 50, stripping of threads on the nut 103/threaded shaft 59, or cracking of the nut 103/threaded shaft 59. The amount of compressive force may be, for example, an amount of force that is less than that which results in cracking of the porcelain tank over the entire lifetime of the toilet fill valve 53 as installed in the toilet tank 50.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A fastener assembly, comprising:
   a nut compatible with a threaded shaft;
   a rotation indicator having at least one indicator extension; and
   at least one protruding structure extending from the nut, the protruding structure interfering with the indicator extension when the nut is rotated on the threaded shaft and the rotation indicator is compressed between the nut and a surface.

2. The fastener assembly of claim 1, further comprising at least one lever radially extending from a side of the nut, the levers being adapted to facilitate a hand turning of the nut onto the threaded shaft.

3. The fastener assembly of claim 1, wherein the rotation indicator further comprises a washer having an orifice, the at least one indicator extension extending from one side of the washer, wherein a diameter of the orifice is greater than an outer diameter of the threaded shaft.

4. The fastener assembly of claim 3, wherein the at least one indicator extension further comprises a cantilever arm extending from one side of the washer.

5. The fastener assembly of claim 4, wherein the at least one indicator extension is positioned along an outer perimeter of the washer.

6. The fastener assembly of claim 1, wherein friction generated between a surface of the rotation indicator and the surface is greater than a friction generated between the rotation indicator and the nut when the rotation indicator is compressed between the nut and the surface.

7. The fastener assembly of claim 6, wherein a face of the rotation indicator adapted to contact the surface comprises a grip surface.

8. The fastener assembly of claim 6, further comprising an adhesive disposed on a face of the rotation indicator adapted to contact the surface.

9. The fastener assembly of claim 6, further comprising a friction coating disposed on a face of the rotation indicator adapted to contact the surface.

10. The fastener assembly of claim 1, further comprising:
    a lip radially extending from an upper portion of the nut; and
    wherein the at least one indicator extension grips the lip, thereby attaching the rotation indicator to the nut.

11. The fastener assembly of claim 10, wherein the at least one indicator extension comprises a cantilever arm that grips the lip.

12. The fastener assembly of claim 1, wherein the at least one protrusion structure further comprises a corner of a nut.

13. The fastener assembly of claim 1, wherein the at least one protrusion structure further comprises a protrusion radially extending from a side surface of the nut.

14. The fastener assembly of claim 13, wherein the protrusion further comprises a ramp.

15. The fastener assembly of claim 13, wherein the protrusion further comprises a ridge extending longitudinally along a side of the nut.

16. The fastener assembly of claim 1, wherein the nut and the rotation indicator are constructed of plastic.

17. The fastener assembly of claim 1, wherein the nut and the rotation indicator are constructed of metal.

18. The fastener assembly of claim 1, wherein the rotation indicator is loosely attached to the nut, thereby resulting in a gap between the nut and the rotation indicator.

19. A method for limiting an amount of torque employed to fasten a nut to a threaded shaft, comprising the steps of:
rotating a nut to engage an inner thread of the nut with an outer thread of the threaded shaft;
rotating the nut along the threaded shaft until a rotation indicator is compressed between the nut and a surface;
causing at least one indicator extension extending from the rotation indicator to periodically engage at least one protrusion structure located on a side of the nut due to the rotation of the nut; and
rotating the nut after the rotation indicator is compressed between the nut and the surface so that the at least one indicator extension engages the at least one protrusion structure a predefined number of times, thereby limiting a force exerted against the surface by the nut.

20. The method of claim 19, further comprising the step of loosely attaching the rotation indicator to a lip extending from a side of the nut with the at least one indicator extension, wherein the at least one indicator extension comprises a cantilever arm.

21. The method of claim 19, further comprising gripping at least one lever extending from a side of the nut by hand to turn the nut on the threaded shaft.

22. The method of claim 19, wherein the threaded shaft extends from the bottom of a toilet fill valve, the method further comprising the steps of:
positioning the threaded shaft of the toilet fill valve through a hole in a porcelain tank of a toilet;
compressing a portion of the porcelain tank between the rotation indicator and a sealing face of the toilet fill valve; and
limiting a compression of the portion of the porcelain tank below an amount of compressive force that results in cracking of the porcelain tank.

23. The fastener assembly of claim 1, further comprising the at least one protruding structure being an integrally molded portion of the nut.

* * * * *